United States Patent
Pierce

(10) Patent No.: US 10,585,747 B2
(45) Date of Patent: *Mar. 10, 2020

(54) DETECTING SINGLE EVENT UPSETS AND STUCK-AT FAULTS IN RAM-BASED DATA PATH CONTROLLERS

(71) Applicant: International Business Machines Corporation, Armonk, NY (US)

(72) Inventor: David A. Pierce, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/109,621

(22) Filed: Aug. 22, 2018

(65) Prior Publication Data

US 2018/0365100 A1 Dec. 20, 2018

Related U.S. Application Data

(63) Continuation of application No. 15/399,646, filed on Jan. 5, 2017, now Pat. No. 10,102,058, which is a
(Continued)

(51) Int. Cl.
*G06F 11/10* (2006.01)
*G06F 3/06* (2006.01)

(52) U.S. Cl.
CPC .......... *G06F 11/1004* (2013.01); *G06F 3/064* (2013.01); *G06F 3/0619* (2013.01);
(Continued)

(58) Field of Classification Search
CPC .. G06F 11/1004; G06F 3/0619; G06F 3/0635; G06F 3/064; G06F 3/0673
See application file for complete search history.

(56) References Cited

U.S. PATENT DOCUMENTS

| 5,280,488 A | 1/1994 | Glover et al. |
| 5,390,199 A | 2/1995 | Ajima et al. |

(Continued)

FOREIGN PATENT DOCUMENTS

| CN | 101141332 A | 3/2008 |
| GB | 002422457 A | 7/2006 |
| JP | 401070999 | 3/1989 |

OTHER PUBLICATIONS

List of IBM Patents or Patent Applications Treated As Related.
(Continued)

*Primary Examiner* — Kyle Vallecillo
(74) *Attorney, Agent, or Firm* — Zilka-Kotab, P.C.

(57) ABSTRACT

In one embodiment, a system includes logic configured to receive data comprising a plurality of data elements, where each data element comprises one or more bits. Further, the logic is configured to output bursts of data comprising the plurality of data elements along with a number of parity bits equal to a number of data elements in the plurality of data elements received from a first parity module to an input of a data path. Further still, the system includes a binary sequence generator configured to create a binary sequence comprising a plurality of bonus bits in a pseudo-random pattern that has less than a predetermined chance of matching any sequence of bits in the data while in the data path. Further still, the first parity module is configured to provide a parity calculation prior to passing the plurality of data elements to the input of the data path.

20 Claims, 5 Drawing Sheets

Related U.S. Application Data continuation of application No. 14/280,424, filed on May 16, 2014, now Pat. No. 9,575,834.

(52) U.S. Cl.
CPC .......... *G06F 3/0635* (2013.01); *G06F 3/0673* (2013.01); *G06F 11/1076* (2013.01); *G06F 2211/104* (2013.01)

(56) References Cited

U.S. PATENT DOCUMENTS

| | | | |
|---|---|---|---|
| 5,774,647 | A | 6/1998 | Raynham et al. |
| 5,862,452 | A | 1/1999 | Cudak et al. |
| 6,594,094 | B2 * | 7/2003 | Rae .......... G11B 5/09 360/25 |
| 8,555,132 | B2 | 10/2013 | Danninger et al. |
| 9,361,196 | B2 | 6/2016 | Kleveland et al. |
| 9,575,834 | B2 | 2/2017 | Pierce |
| 10,102,058 | B2 | 10/2018 | Pierce |
| 2007/0140369 | A1 | 6/2007 | Limberg |
| 2008/0109691 | A1 | 5/2008 | Dieffenderfer et al. |
| 2008/0189581 | A1 | 8/2008 | Femal |
| 2009/0292968 | A1 | 11/2009 | Cypher |
| 2010/0064092 | A1 | 3/2010 | Hess et al. |
| 2010/0088574 | A1 | 4/2010 | Kim et al. |
| 2011/0004793 | A1 * | 1/2011 | Sul .......... G11C 29/003 714/718 |
| 2012/0084628 | A1 | 4/2012 | Cox et al. |
| 2015/0331747 | A1 | 11/2015 | Pierce |
| 2017/0116073 | A1 | 4/2017 | Pierce |

OTHER PUBLICATIONS

Pierce, D., U.S. Appl. No. 14/280,424, filed May 16, 2014.
Allen et al., "Single-Event Upset (SEU) Results of Embedded Error Detect and Correct Enabled Block Random Access Memory (Block RAM) Within the Xilinx XQR5VFX130," IEEE Transactions on Nuclear Science, vol. 57, No. 6, Dec. 2010, pp. 3426-3431.
Non-Final Office Action from U.S. Appl. No. 14/280,424, dated Dec. 21, 2015.
Final Office Action from U.S. Appl. No. 14/280,424, dated Jul. 8, 2016.
Notice of Allowance from U.S. Appl. No. 14/280,424, dated Oct. 7, 2016.
Pierce, D., U.S. Appl. No. 15/399,646, filed Jan. 5, 2017.
Non-Final Office Action from U.S. Appl. No. 15/399,646, dated Feb. 24, 2017.
Final Office Action from U.S. Appl. No. 15/399,646, dated Jun. 22, 2017.
Non-Final Office Action from U.S. Appl. No. 15/399,646, dated Nov. 20, 2017.
Notice of Allowance from U.S. Appl. No. 15/399,646, dated Jun. 7, 2018.

* cited by examiner

DETECTING SINGLE EVENT UPSETS AND STUCK-AT FAULTS IN RAM-BASED DATA PATH CONTROLLERS

BACKGROUND

The present invention relates to data path management, and more specifically, this invention relates to detecting single event upsets and stuck-at faults in random access memory (RAM)-based data path controllers.

Typically, a stuck-at fault is a fault-model that may be used to imitate a manufacturing defect in integrated circuit (IC)-based memory modules, such as those which utilize RAM. Electronic communications, control, and storage systems often require controllers with complex data paths involving multiple memory modules, such as data buffers and first-in-first-out (FIFO) buffers. The underlying memory elements for these modules typically utilize RAM. The integrity of the data being passed through RAM-based data paths is vulnerable to corruption from two kinds of faults: soft errors (single-event upsets) and hard errors (e.g., stuck-at faults and bridging faults). Field Programmable Gate Array (FPGA)-based systems are vulnerable to some additional failure mechanisms: both soft and hard failures in the configuration memories that define their operation.

Systems typically employ methods for ensuring data integrity end-to-end, depending on the criticality of delivering pristine data and the probability of encountering failures. Even so, lower level data integrity checks are often used to detect failures quickly and to identify their location, so that the system has sufficient data to pursue an appropriate fault recovery strategy (e.g., reset, reprogram, remove from service, etc.).

One method for detecting single-bit data failures is parity generation and checking. This method involves applying exclusive-or (XOR) to all the bits in each data word, storing the single-bit result with the data word, then checking the XOR result when data is read. RAM is often constructed with data widths that allow one parity bit per byte of data to accommodate a data parity scheme. Address faults (e.g., stuck-at or bridging faults affecting the address lines of RAM) are often covered by applying XOR to the address used to store each data word and including the result in the calculation of the per-word data parity. Of course, this assumes that the address used to write each data word to RAM is the same as the address used to read each word from RAM.

Generating and checking parity at each RAM in the data path may be unnecessarily expensive. It is often sufficient to isolate a failure to a more general location, such as somewhere in this data path, where the data path may have multiple stages of memory elements. A scheme where data is calculated at the start of the data path and passed along to the end for checking, would be an inexpensive method for checking single-bit soft and hard failures. Such a method, however, fails to cover a large set of faults, including address faults, that may break the sequence in which data traverses the data path. Adding address parity at the front end for checking at the back end also does not provide a general solution, since input and output addressing may not correspond.

A data checking method that checks both data and sequence is the cyclic redundancy check (CRC). As data enters the communication or storage channel, a CRC value is calculated for the data sequence using polynomial division. This value is appended to the data sequence. At the output of the channel, the entire sequence, including both original data and CRC value, is subjected to the same polynomial division and checked against a constant value (usually zero). A non-matching result indicates an error in the data sequence. Such an approach covers both data and address faults.

However, many data path controllers involve modification of the data midstream. For example, storage controllers supporting redundant array of independent disk (RAID) reconstruction rebuild data by applying XOR to data from multiple pages in the RAID stripe. Restoring the CRC value during the rebuild process would require a significant increase in complexity (for example, recalculating CRC during the final stage of rebuilding, or storing the CRC values for every page in the stripe).

SUMMARY

In one embodiment, a system includes a hardware processor and logic integrated with the hardware processor, executable by the hardware processor, or integrated with and executable by the hardware processor. Additionally, the logic is configured to receive data comprising a plurality of data elements, where each data element comprises one or more bits. Further, the logic is configured to output bursts of data comprising the plurality of data elements along with a number of parity bits equal to a number of data elements in the plurality of data elements received from a first parity module to an input of a data path, where each parity bit corresponds to a single data element, where each burst of data is restricted from being greater in length that a predetermined maximum burst size. Further still the system includes a first binary sequence generator including at least one linear feedback shift register (LFSR) implemented in hardware, where the first binary sequence generator is configured to create a binary sequence comprising a plurality of bonus bits in a pseudo-random pattern that has less than a predetermined chance of matching any sequence of bits in the data while in the data path, where a total length of the binary sequence is equal to or greater than the predetermined maximum burst size. Further still, the first parity module is configured to provide a parity calculation prior to passing the plurality of data elements to the input of the data path, where the parity calculation uses bits of each data element along with a bonus bit from the binary sequence to produce a corresponding parity bit for each data element.

In another embodiment, a method includes receiving, by a processing circuit, data comprising a plurality of data elements, where each data element comprises one or more bits. The method further includes using a first binary sequence generator comprising at least one linear feedback shift register (LFSR) implemented in hardware to create a binary sequence comprising a plurality of bonus bits in a pseudo-random pattern that has less than a predetermined chance of matching any sequence of bits in the data while in a data path, where a total length of the binary sequence is equal to or greater than a predetermined maximum burst size. The method further includes using a first parity module to provide a parity calculation prior to passing the plurality of data elements to an input of the data path, where the parity calculation uses bits of each data element along with a bonus bit from the binary sequence to produce a corresponding parity bit for each data element. The method further includes outputting, by the processing circuit, bursts of data comprising the plurality of data elements along with a number of parity bits equal to a number of data elements in the plurality of data elements received from a first parity module to the input of the data path, each parity bit corresponding to a single data element, where each burst of data is restricted from being greater in length that the predetermined maximum burst size.

In yet another embodiment, a computer program product includes a computer readable storage medium having program instructions embodied therewith, where the embodied program instructions are executable by a processor to cause the processor to receive, by the processor, data comprising a plurality of data elements, where each data element comprising one or more bits. Additionally, the embodied program instructions are executable by a processor to cause the processor to use, by the processor, a first binary sequence generator comprising at least one linear feedback shift register (LFSR) implemented in hardware to create a binary sequence comprising a plurality of bonus bits in a pseudo-random pattern that has less than a predetermined chance of matching any sequence of bits in the data while in a data path, where a total length of the binary sequence is equal to or greater than a predetermined maximum burst size. Further, the embodied program instructions are executable by a processor to cause the processor to use, by the processor, a first parity module to provide a parity calculation prior to passing the plurality of data elements to an input of the data path, the parity calculation using bits of each data element along with a bonus bit from the binary sequence to produce a corresponding parity bit for each data element. Also, the embodied program instructions are executable by a processor to cause the processor to output, by the processor, bursts of data comprising the plurality of data elements along with a number of parity bits equal to a number of data elements in the plurality of data elements received from a first parity module to the input of the data path, where each parity bit corresponds to a single data element, and where each burst of data is restricted from being greater in length that the predetermined maximum burst size.

Other aspects and embodiments of the present invention will become apparent from the following detailed description, which, when taken in conjunction with the drawings, illustrate by way of example the principles of the invention.

DETAILED DESCRIPTION

Figure 1:
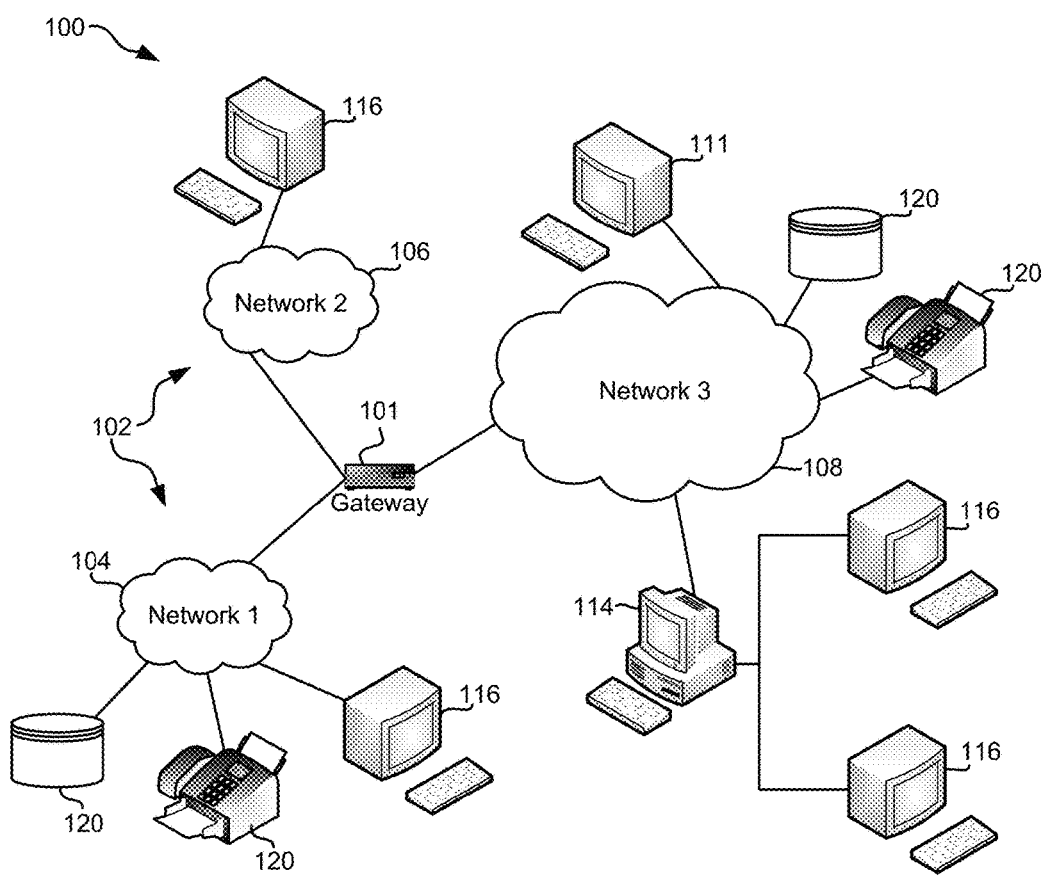
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products that address deficiencies in data parity and cyclic redundancy check (CRC) schemes by providing a general low-cost method for end-to-end parity generation and checking that the scheme provides coverage for both data and sequencing faults. Furthermore, simple modifications to the data in midstream is allowed, such as during a redundant array of independent disk (RAID) reconstruct scenario.

In one general embodiment, a system includes a processor and logic integrated with and/or executable by the processor, the logic being configured to receive data including a plurality of data elements, each data element having one or more bits, and pass each data element along with a corresponding parity bit to an input of a data path, a first binary sequence generator configured to create a binary sequence having a plurality of bonus bits, wherein a total length of the binary sequence is equal to or greater than a maximum burst size of the data, and a first parity module configured to provide a parity calculation using bits of each data element of the data with a bonus bit from the binary sequence to produce a parity bit for each data element.

In another general embodiment, a method includes receiving data having a plurality of data elements, each data element including one or more bits, creating a binary sequence having a plurality of bonus bits using a first binary sequence generator, a total length of the binary sequence being equal to or greater than a maximum burst size of the data, using a first parity module to provide a parity calculation using bits of each data element of the data with a bonus bit from the binary sequence, the parity calculation producing a parity bit for each data element, and passing each data element along with its corresponding parity bit to an input of a data path.

In yet another general embodiment, a computer program product includes a computer readable storage medium having program instructions embodied therewith, the program instructions readable and/or executable by a processor to cause the processor to: receive, by the processor, data having a plurality of data elements, each data element including one or more bits, create, by the processor, a binary sequence having a plurality of bonus bits using a first binary sequence generator, a total length of the binary sequence being equal to or greater than a maximum burst size of the data, use, by the processor, a first exclusive-or (XOR) module to provide a XOR calculation using bits of each data element of the data with a bonus bit from the binary sequence, the XOR calculation producing a parity bit for each data element, and pass, by the processor, each data element along with its corresponding parity bit to an input of a data path.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
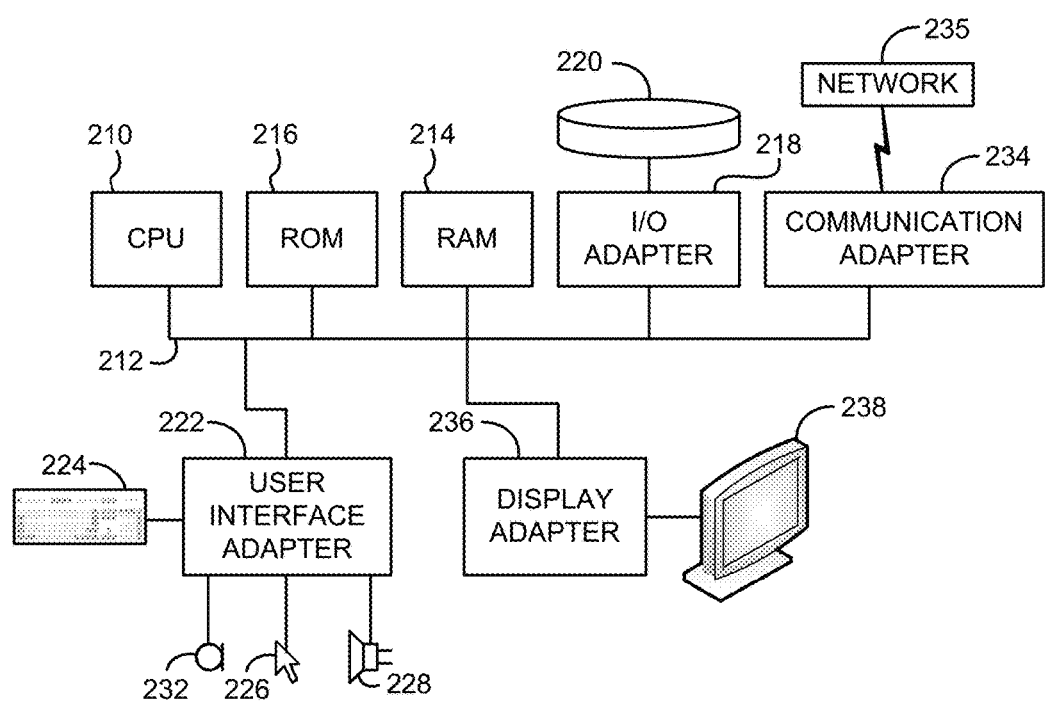
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
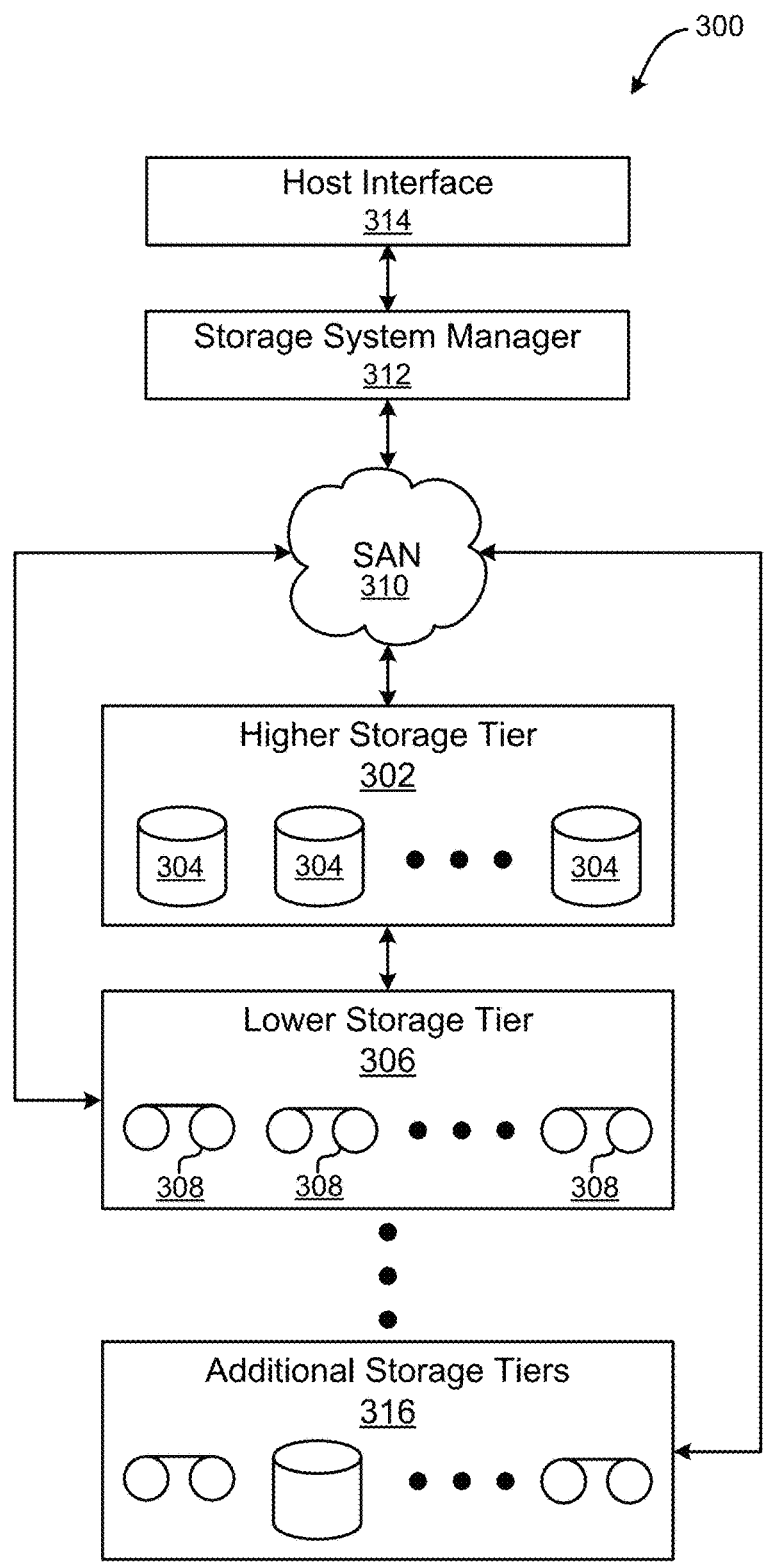
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), integrated circuit (IC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

According to one embodiment, a data parity generation and checking scheme is used that covers both data integrity and sequence in which data flows through at least two memories in a data path. In this embodiment, at the input(s) to the data path, parity is calculated over each data element (the size of each data element, whether it is a byte, a word, a double word, etc.). Presumably, designers of particular parity schemes will choose an element size based on the trade-off between resource use and fault detection effectiveness, and therefore which size of data element used is variable in the embodiments described herein. In addition to the bits of the data element, a bonus bit from a pseudo-random binary sequence (PRBS) generator is added to the XOR calculation of the parity bit. In more embodiments, some other suitable source of single bonus bits which are unlikely to match sequences in the data path may be used, as would be understood by one of skill in the art upon reading the present descriptions. One purpose of including the bonus bits in the parity calculation is to provide a sequence-dependent component, which may then be decoded at a later time to ensure the sequence is correct. At the end of the data path where parity checking is performed, the same source of bonus bits, such as PRBS, is included in the parity check in order to back out the bonus bits and check their accuracy against the now produced bonus bit. If any fault in the data path has disturbed either content of the data or sequence of the data, the parity check will fail.

This embodiment covers single faults per data element, as well as a large sets of faults, single or multiple, that affect the data sequence. The latter might include faults in RAM addresses, address counters, FIFO control logic, state machines that control memory access, etc. In addition, it is possible to cover faults in handling out-of-band metadata, additionally.

Bonus bit production, such as via PRBS generation, may be accomplished using linear feedback shift registers (LFSRs), which offer both low cost and high performance. The LFSR's pseudo-random nature makes it highly unlikely that sequence-affecting faults would go undetected due to sequence aliasing (having a fault produce a sequential component of the parity check that matches the PRBS).

Figure 4:
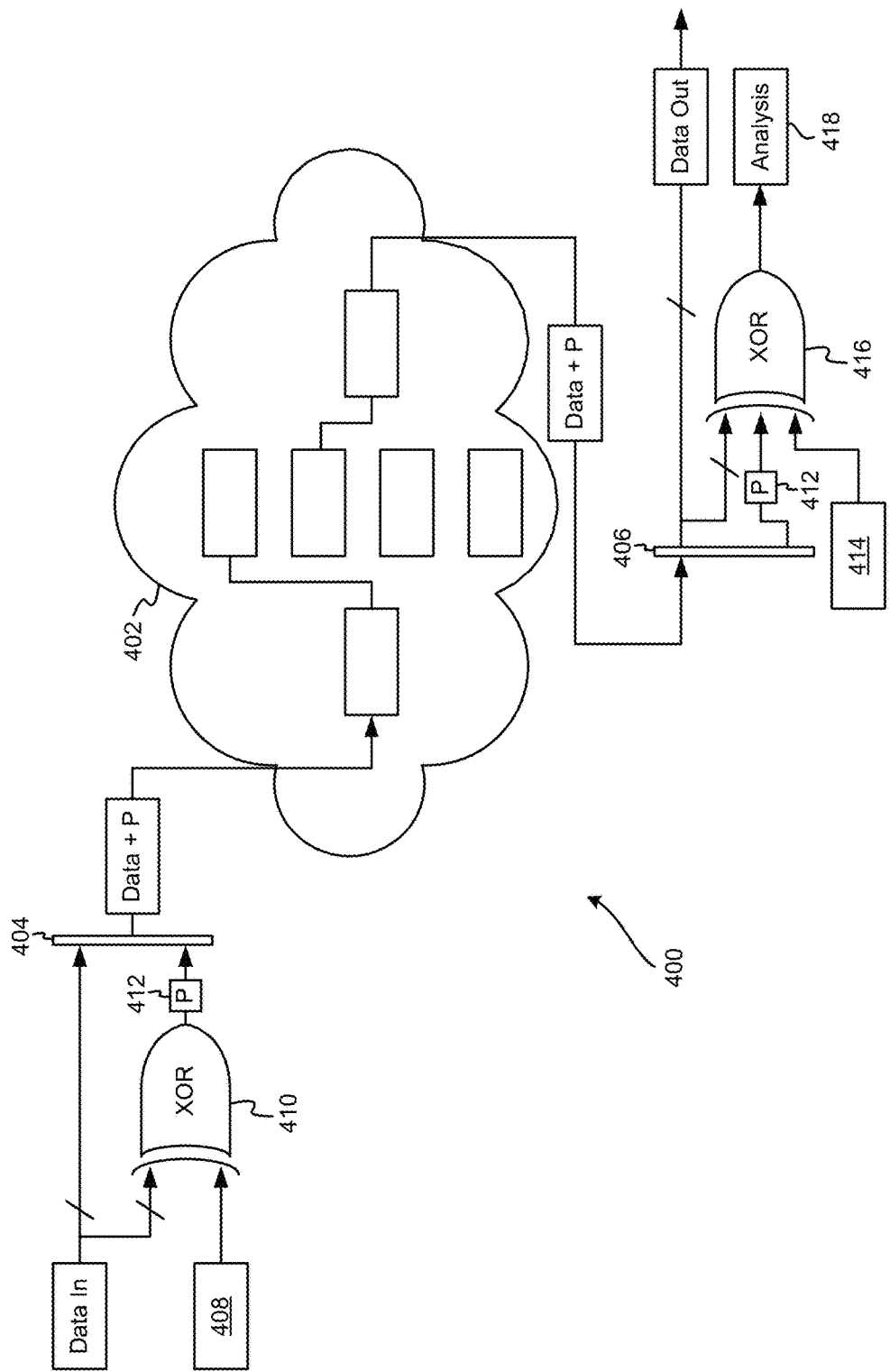
FIG. 4 shows a system according to one embodiment.

Now referring to FIG. 4, a system 400 is shown according to one embodiment. The system 400 may be used for detecting single event upsets and stuck-at faults in RAM-based data path controllers, according to one embodiment.

It may be assumed that data enters the data path 402 in bursts of varying sizes, but the sizes never exceed a predetermined and/or calculated threshold, referred to as maximum burst size (MAX_BURST_SIZE). The threshold may be determined and/or based on any conditions, parameters and/or properties of the system and/or components thereof. It may also be assumed that the data will exit the data path 402 in bursts having the same size in which the data entered. Further, it may be assumed that at both the input 404 and the output 406 of the data path 402, sufficient information is available to identify the beginning of each burst.

As shown in FIG. 4, a first binary sequence generator 408 is positioned at the input 404 to the data path 402. The first binary sequence generator 408 may be configured to provide a binary sequence comprising a plurality of bonus bits, the binary sequence having a length greater than or equal to the MAX_BURST_SIZE. In one embodiment, the first binary sequence generator 408 may include one or more LFSRs, each of which is configured to provide a pseudo-random binary sequence, with a total length of all pseudo-random binary sequences from the one or more LFSRs being greater than or equal to the MAX_BURST_SIZE.

In an alternative embodiment, the first binary sequence generator 408 may comprise a ROM or a patterned ROM in which values are retrieved in random or according to some predetermined pattern which would have a negligible chance of producing a binary sequence that matched any bits of the data while in the data path.

At the beginning of each burst of data from the data stream, the first binary sequence generator 408 is initialized to a constant value. A parity bit 412 is generated using a parity calculation in a first parity module 410 based on the bits of each incoming data element (byte, word, double word, etc.) and a bonus bit from the first binary sequence generator 408, to produce a parity bit 412. To provide a context, and by way of example only, the first parity module 410 will hereafter be described as a first XOR module that applies an XOR calculation. Note that other types of parity calculations may be used, as would be known to one skilled in the art upon reading the present disclosure, such as an XNOR, etc.

Continuing with the example, the bits of each incoming data element (byte, word, double word, etc.) and a bonus bit from the first binary sequence generator 408 may be exclusive-ored (XOR'd) at the first XOR module 410 to produce the parity bit 412 which accompanies the data element through the data path 402.

At the output 406 of the data path 402, the data element, its accompanying parity bit 412, and output from a second binary sequence generator 414 (which is matched to the first binary sequence generator 408) are processed to produce a result by a second parity module 416, which is hereinafter referred to as a second XOR module 416, for exemplary purposes only. The result may be analyzed using an analysis module 418 in one embodiment. When the result is null or zero ("0"), it may indicate no errors in the data, in one embodiment. A non-zero result may indicate a failure somewhere in the data path 402, either in the content of the data or in the sequencing of the data through the data path 402. Sequencing errors may occur when some portions of the data propagate through the data path 402 more quickly than other portions, which would cause the contents of the data to be out of sequence at the output 406 of the data path 402.

In an alternate embodiment, a zero result may indicate a failure somewhere in the data path 402, either in the content of the data or in the sequencing of the data through the data path 402 while a result of null or zero ("0") may indicate no errors in the data. Either way, as long as the convention is set, e.g., whether 0 indicates no error or error(s), and is understood by the components of the system, then the result of the analysis module 418 will reveal whether any errors exist in the data path 402.

One useful property of maximal-length pseudo-random binary sequence generators is that they produce full-length sequences regardless of their initial values. This property may be exploited to cover faults affecting out-of-band metadata normally outside the scope of data parity generation and checking.

For example, a system may be configured such that each burst of data has a corresponding tag or label that is used to match each data burst with the system command that produced it. Assume that the tag value is available at both the input and the output of the data path. By making the initial value of the binary sequence generator (such as a LFSR) dependent on the value of the tag, not only is the data and sequence checked, but also the logic and memory involved in maintaining correspondence between the tag value and the data burst.

The simplicity of per-element parity generation allows for easier recovery of the sequential component (bonus bit, e.g., a PRBS value) for an element of data, anywhere in the data path by simply XORing the data and parity bits to get the bonus bit, e.g., a PRBS value, for that location in the sequence. This is especially useful when midstream modifications to the data are performed and/or required. All that is needed is to read the data, derive the bonus bit from current data and parity values, modify the data, and use the bonus bit to calculate a modified data parity to accompany the new data value.

According to one embodiment, a system may comprise a processor and logic integrated with and/or executable by the processor, the logic being configured to: receive data comprising a plurality of data elements, each data element comprising one or more bits, and pass each data element along with a corresponding parity bit 412 to the input 404 of the data path 402. The system may also include a first binary sequence generator 408 configured to create a binary sequence comprising a plurality of bonus bits, wherein a total length of the binary sequence is equal to or greater than a maximum burst size of the data, and a first XOR module 410 configured to provide a XOR calculation using bits of each data element of the data with a bonus bit from the binary sequence to produce a parity bit 412 for each data element.

In a further embodiment, the logic may be further configured to: receive each data element along with its corresponding parity bit 412 at the output 406 of the data path 402, and analyze (such as by using an analysis module 418) a result to determine whether an error has occurred to the data in the data path 402. In addition, the system may include a second binary sequence generator 414 configured to create the binary sequence at the output 406 of the data path 402 and a second XOR module 416 configured to XOR together bits of each data element along with its corresponding parity bit 412 and a bonus bit from the binary sequence to produce the result.

Figure 5:
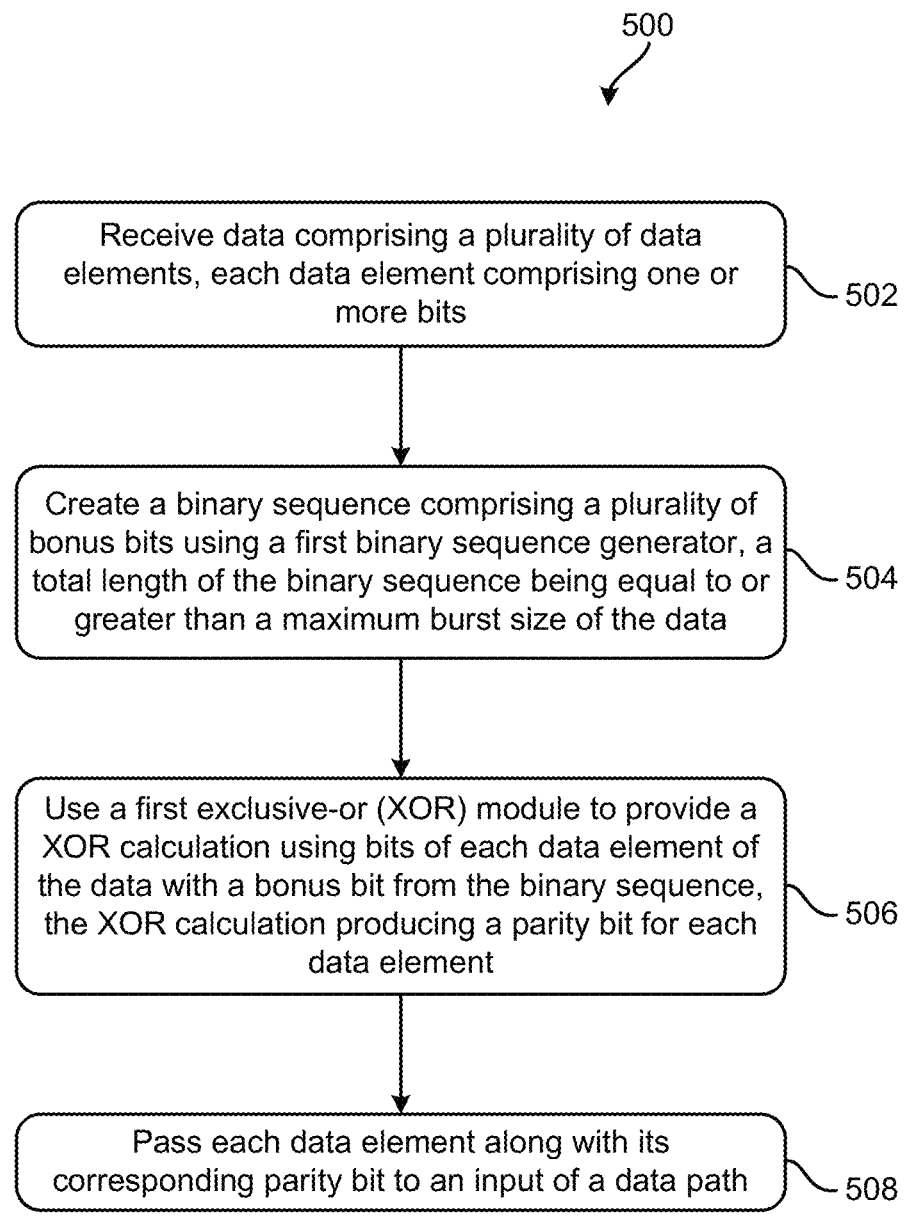
FIG. 5 shows a flowchart of a method according to one embodiment.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a data path controller, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a CPU, an ASIC, a FPGA, etc., combinations thereof, or any other suitable computing device known in the art.

As shown in FIG. 5, method 500 may initiate with operation 502, where data comprising a plurality of data elements is received. Each data element comprises one or more bits of data. Accordingly, the data element may be a bit, a byte, a word, a double word, or any other collection of data as would be known in the art. The data may be received as a stream, in chunks, in bursts, or in any other fashion known in the art.

In operation 504, a binary sequence is created. The binary sequence comprises a plurality of bonus bits using a first binary sequence generator, a total length of the binary sequence being equal to or greater than a maximum burst size of the data.

The binary sequence may be configured so as to not coincide with any bit sequence of the data while in the data path. Therefore, in one embodiment, the binary sequence may be decimal-based as opposed to hexadecimal-based. In other approaches, any other methodology of differentiating the binary sequence from the data elements in the data path may be used, as known in the art.

In operation 506, a first XOR module is used to XOR together (in a XOR calculation) bits of each data element of the data with one or more bonus bits from the binary sequence to produce a parity bit for each data element.

In a further embodiment, meta data (such as tags, flags, etc.) may be included in the XOR calculation to produce the parity bit. In this way, not only is the data in the data element and the sequence of the data protected, but also any meta data that is desired to be included in the XOR calculation may also be protected from errors.

In one embodiment, when one or more FPGAs are included in the data path, the data element may be a byte to take advantage of the FPGA's native ability to store a byte of data with a parity bit. Of course, in other memory or data path components, some other advantages may be drawn from using different sized data elements, any of which are compatible with this method 500.

In operation 508, each data element is passed along with its corresponding parity bit to an input of a data path. The data path, in various embodiments, may include any desired functionality, such as a first-in-first-out (FIFO) buffer, a store and forward buffer, a RAM to other such memory, sequential logic, a flash memory such as non-volatile RAM, etc., or any other data path component known in the art.

In one embodiment, the method 500 may further include receiving each data element along with its corresponding parity bit at an output of the data path, creating the binary sequence using a second binary sequence generator, using a second XOR module to XOR together bits of each data element along with its corresponding parity bit and a bonus bit from the binary sequence (in a second XOR calculation) to produce a result, and analyzing the result to determine whether an error has occurred to the data in the data path. In this way, after the data has passed through the data path, such as being stored in and retrieved from a RAM, the consistency of the data, the sequence of data, and any included meta data may be checked for errors.

According to one approach, analyzing the result may include determining whether the result is zero. A zero result would indicate that no error occurred to the data while in the data path, and a non-zero result would indicate that an error occurred to the data while in the data path. The type of error and where it exactly occurred may or may not be discovered from the result.

After analyzing the result, error(s) may be reported to some component or module, such as a controller, administrator, etc. The error(s) may be reported alone or in combination with a location indicated as somewhere in the data path.

In another embodiment, the second binary sequence generator may be matched to the first binary sequence generator, in order to provide the exact same binary sequence at the input and the output of the data path to allow for the error check to be performed.

According to another embodiment, the data which exits the output of the data path may exist in burst sizes that are equal to burst sizes of the data that entered the input of the data path. In this way, the sequence of the data entering and exiting the data path may be checked.

In another approach, the first binary sequence generator and/or the second binary sequence generator may each comprise one or more LFSRs. Also, the binary sequence may be a pseudo-random binary sequence, a random binary sequence, a partially repeating binary sequence.

In this or any other approach, the binary sequence may be unlikely (i.e., have less than a 0.1% chance, 0.01% chance, 0.0001% chance, etc.) to match any sequence of bits in the data while in the data path. Sequence aliasing probability is highly dependent on the system implementation, and therefore the exact chance of matching may only be calculated from the actual implementation. For example, in systems with addresses following a normal binary count, the probability of a fault-produced sequence aliasing a PRBS is virtually zero. When using such binary sequences, the binary sequence would have virtually no chance of matching any sequence of bits in the data while in the data path. In this approach, the binary sequence would not be inadvertently duplicated by the data while in the data path, which would result in additional problems and confusion. This is a property of pseudo-random binary sequences that are generated from LFSRs, and therefore using one or more LFSRs is preferred in one embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

Some advantages over other approaches to detecting data and sequencing faults in complex controllers with multiple memory stages includes: 1) greater fault coverage than simple data parity by using a sequencing component in the parity calculation; 2) more generality than data and address parity schemes, since addressing (and therefore address parity) may not be consistent across the data path; 3) less complexity than CRC generation and checking, especially when midstream data modifications occur; 4) low resource utilization and high performance when using LFSRs to provide the sequencing component of the parity generation and checking; 5) minimal overhead by using resources built into memory blocks specifically for parity storage, such as in FPGAs. Other advantages may also be present which are not specifically addressed herein.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a hardware processor; and
   logic integrated with the hardware processor, executable by the hardware processor, or integrated with and executable by the hardware processor, the logic being configured to:
   receive data comprising a plurality of data elements, each data element comprising one or more bits; and
   output bursts of data comprising the plurality of data elements along with a number of parity bits equal to a number of data elements in the plurality of data elements received from a first parity module to an input of a data path, each parity bit corresponding to a single data element, wherein each burst of data is restricted from being greater in length than a predetermined maximum burst size;
   a first binary sequence generator comprising at least one linear feedback shift register (LFSR) implemented in hardware, the first binary sequence generator being configured to create a binary sequence comprising a plurality of bonus bits in a pseudo-random pattern that has less than a predetermined chance of matching any sequence of bits in the data while in the data path, wherein a total length of the binary sequence is equal to or greater than the predetermined maximum burst size; and
   the first parity module configured to provide a parity calculation prior to passing the plurality of data elements to the input of the data path, the parity calculation using bits of each data element along with a bonus bit from the binary sequence to produce a corresponding parity bit for each data element.

2. The system as recited in claim 1, wherein the logic is further configured to:
   receive the bursts of data comprising each data element along with its corresponding parity bit at an output of the data path; and
   analyze a result to determine whether an error has occurred to the data in the data path,
   wherein the system further comprises:
   a second binary sequence generator configured to create the binary sequence at the output of the data path; and a second parity module configured to produce the result based on bits of each data element from the bursts of data along with its corresponding parity bit received at the output of the data path and a bonus bit from the binary sequence generated by the second binary sequence generator.

3. The system as recited in claim 2, wherein the second binary sequence generator is matched to the first binary sequence generator.

4. The system as recited in claim 2, wherein the bursts of data received at the output of the data path have burst sizes that are equal to a burst size of the bursts of data that entered the input of the data path.

5. The system as recited in claim 2, wherein the logic configured to analyze the result is further configured to determine whether the result is zero, wherein a zero result indicates that no error occurred to the data while in the data path, and wherein a non-zero indicates that an error occurred to the data while in the data path.

6. The system as recited in claim 2, wherein the first binary sequence generator comprises one or more linear feedback shift registers (LFSRs), and wherein the binary sequence is a pseudo-random binary sequence.

7. The system as recited in claim 2, wherein the second binary sequence generator comprises one or more linear feedback shift registers (LFSRs), and wherein the binary sequence is a pseudo-random binary sequence.

8. The system as recited in claim 1, wherein the data path comprises at least one element selected from a group of elements comprising: a first-in-first-out (FIFO) buffer, a store and forward buffer, a random access memory (RAM), sequential logic, and a flash memory.

9. The system as recited in claim 1, wherein meta data is included in the parity calculation to produce the parity bit.

10. A method, comprising:
receiving, by a processing circuit, data comprising a plurality of data elements, each data element comprising one or more bits;
using a first binary sequence generator comprising at least one linear feedback shift register (LFSR) implemented in hardware to create a binary sequence comprising a plurality of bonus bits in a pseudo-random pattern that has less than a predetermined chance of matching any sequence of bits in the data while in a data path, wherein a total length of the binary sequence is equal to or greater than a predetermined maximum burst size;
using a first parity module to provide a parity calculation prior to passing the plurality of data elements to an input of the data path, the parity calculation using bits of each data element along with a bonus bit from the binary sequence to produce a corresponding parity bit for each data element; and
outputting, by the processing circuit, bursts of data comprising the plurality of data elements along with a number of parity bits equal to a number of data elements in the plurality of data elements received from a first parity module to the input of the data path, each parity bit corresponding to a single data element, wherein each burst of data is restricted from being greater in length than the predetermined maximum burst size.

11. The method of claim 10, further comprising:
receiving the bursts of data comprising each data element along with its corresponding parity bit at an output of the data path;
creating the binary sequence at the output of the data path using a second binary sequence generator;
using a second parity module to produce a result based on bits of each data element from the bursts of data along with its corresponding parity bit received at the output of the data path and a bonus bit from the binary sequence generated by the second binary sequence generator; and
analyzing the result to determine whether an error has occurred to the data in the data path.

12. The method of claim 11, wherein the second binary sequence generator is matched to the first binary sequence generator, and wherein the bursts of data received at the output of the data path have burst sizes that are equal to a burst size of the bursts of data that entered the input of the data path.

13. The method of claim 11, wherein the analyzing the result comprises determining whether the result is zero, wherein a zero result indicates that no error occurred to the data while in the data path, and wherein a non-zero indicates that an error occurred to the data while in the data path.

14. The method of claim 11, wherein the first binary sequence generator and the second binary sequence generator each comprise one or more linear feedback shift registers (LFSRs), and wherein the binary sequence is a pseudo-random binary sequence.

15. The method of claim 10, wherein the data path comprises at least one element selected from a group of elements comprising: a first-in-first-out (FIFO) buffer, a store and forward buffer, a random access memory (RAM), sequential logic, and a flash memory.

16. The method of claim 10, wherein meta data is included in the parity calculation to produce the parity bit.

17. A computer program product, the computer program product comprising a computer readable storage medium having program instructions embodied therewith, the embodied program instructions executable by a processor to cause the processor to:
receive, by the processor, data comprising a plurality of data elements, each data element comprising one or more bits;
use, by the processor, a first binary sequence generator comprising at least one linear feedback shift register (LFSR) implemented in hardware to create a binary sequence comprising a plurality of bonus bits in a pseudo-random pattern that has less than a predetermined chance of matching any sequence of bits in the data while in a data path, wherein a total length of the binary sequence is equal to or greater than a predetermined maximum burst size;
use, by the processor, a first parity module to provide a parity calculation prior to passing the plurality of data elements to an input of the data path, the parity calculation using bits of each data element along with a bonus bit from the binary sequence to produce a corresponding parity bit for each data element; and
output, by the processor, bursts of data comprising the plurality of data elements along with a number of parity bits equal to a number of data elements in the plurality of data elements received from a first parity module to the input of the data path, each parity bit corresponding to a single data element, wherein each burst of data is restricted from being greater in length than the predetermined maximum burst size.

18. The computer program product of claim 17, wherein the embodied program instructions are further executable by the processor to cause the processor to:

receive, by the processor, the bursts of data comprising each data element along with its corresponding parity bit at an output of the data path;

create, by the processor, the binary sequence using a second binary sequence generator at the output of the data path;

use, by the processor, a second parity module configured to produce a result based on bits of each data element from the bursts of data along with its corresponding parity bit received at the output of the data path and a bonus bit from the binary sequence generated by the second binary sequence generator; and analyze, by the processor, the result to determine whether an error has occurred to the data in the data path.

19. The computer program product of claim 18, wherein the second binary sequence generator is matched to the first binary sequence generator, and wherein the bursts of data received at the output of the data path have burst sizes that are equal to a burst size of the bursts of data that entered the input of the data path.

20. The computer program product of claim 19, wherein the embodied program instructions executable to analyze the result further cause the processor to determine whether the result is zero, wherein a zero result indicates that no error occurred to the data while in the data path, and wherein a non-zero indicates that an error occurred to the data while in the data path.

* * * * *